May 23, 1950     J. E. STORMENT     2,508,434
LIQUID LEVEL CONTROL

Filed Jan. 31, 1945     2 Sheets-Sheet 1

INVENTOR
J.E. STORMENT
BY *Hudson and Young*
ATTORNEYS

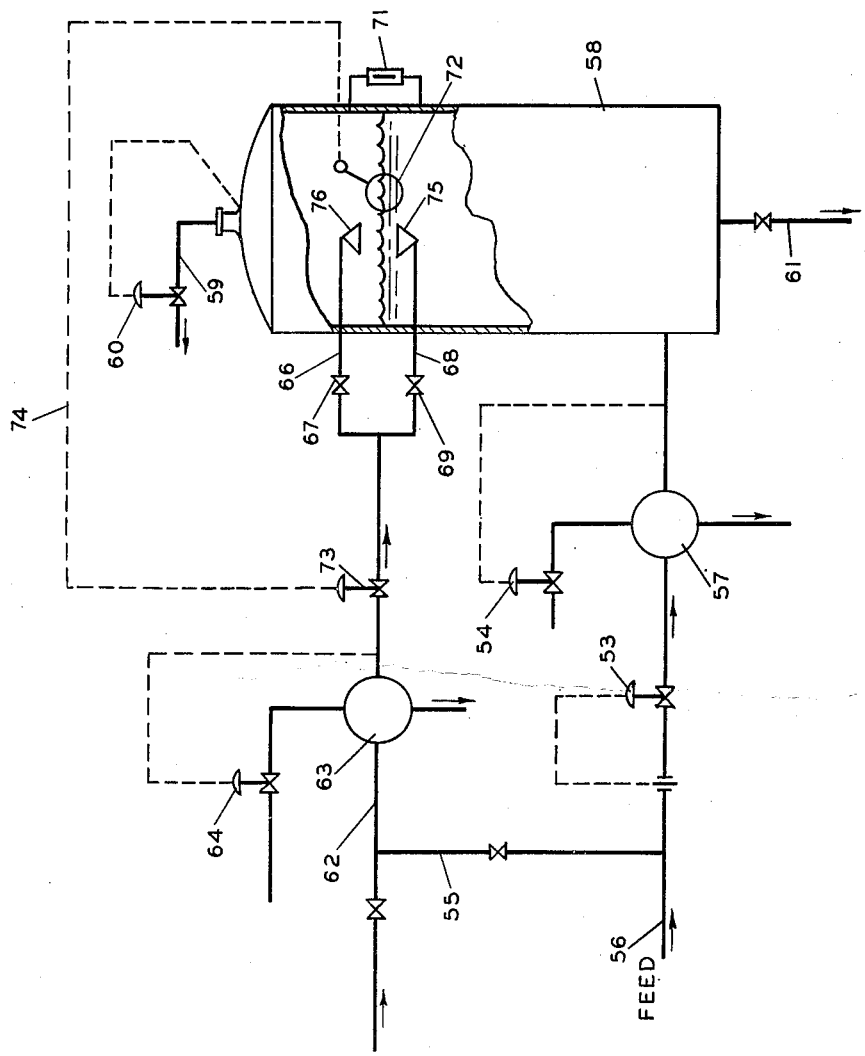

Patented May 23, 1950

2,508,434

UNITED STATES PATENT OFFICE 2,508,434

LIQUID LEVEL CONTROL

Joseph E. Storment, Bartlesville, Okla., assignor to Phillips Petroleum Company, a corporation of Delaware Application January 31, 1945, Serial No. 575,507

6 Claims. (Cl. 260—683.5)

This invention relates to apparatus and methods for the control of the liquid level of an evaporating liquid. In one specific embodiment this invention relates to an automatic means for maintaining a boiling liquid at a constant and desired level in a tower.

A related means and method for accomplishing similar results is shown in my copending application Serial No. 527,121 filed March 18, 1944, now Patent No. 2,473,737.

In evaporation processes in which a liquid is continuously fed into a vessel and vapor is removed therefrom, it is frequently difficult to prevent the liquid-vapor interface from fluctuating considerably which often causes some liquid to go overhead with the vapor or causes an unsteady flow of vapor effluent from the vessel. Liquid when present with the vapor not only decreases the quality of the vapor but also hampers the operation of subsequent equipment; an unsteady vapor flow will result in overburdening and underburdening any subsequent equipment which might be used to process the vapor.

The fluctuating liquid level in a vessel of boiling liquid is the result of increased or decreased evaporation caused by variations in heat input incurred through uncontrollable minor changes in the control instruments and variations in heat losses through the vessel walls from changing atmospheric conditions.

Thus, for the efficient and accurate operation of processes involving the evaporation of liquids both a method and apparatus for maintaining a constant level of the evaporating liquid are much to be desired.

An object of this invention is to provide methods and apparatus for maintaining the level of boiling liquid in a tower constant and also assuring uniform quality and quantity of effluent vapor leaving the tower.

Another object of this invention is to provide methods of controlling the liquid level in packed and unpacked towers.

Another object of the invention is to provide apparatus for controlling the liquid level in packed and unpacked towers.

Still another object is to provide an automatic method and apparatus for maintaining the level of an evaporating liquid at a desired height in a tower.

Other objects and advantages will be obvious to those skilled in the art from the accompanying specifications, claims and drawings.

In the drawings:

Figure 2 is an elevational view with parts broken away showing diagrammatically a modified method and means of controlling the liquid level in a tower similar to that shown in Figure 1.

Figure 1:
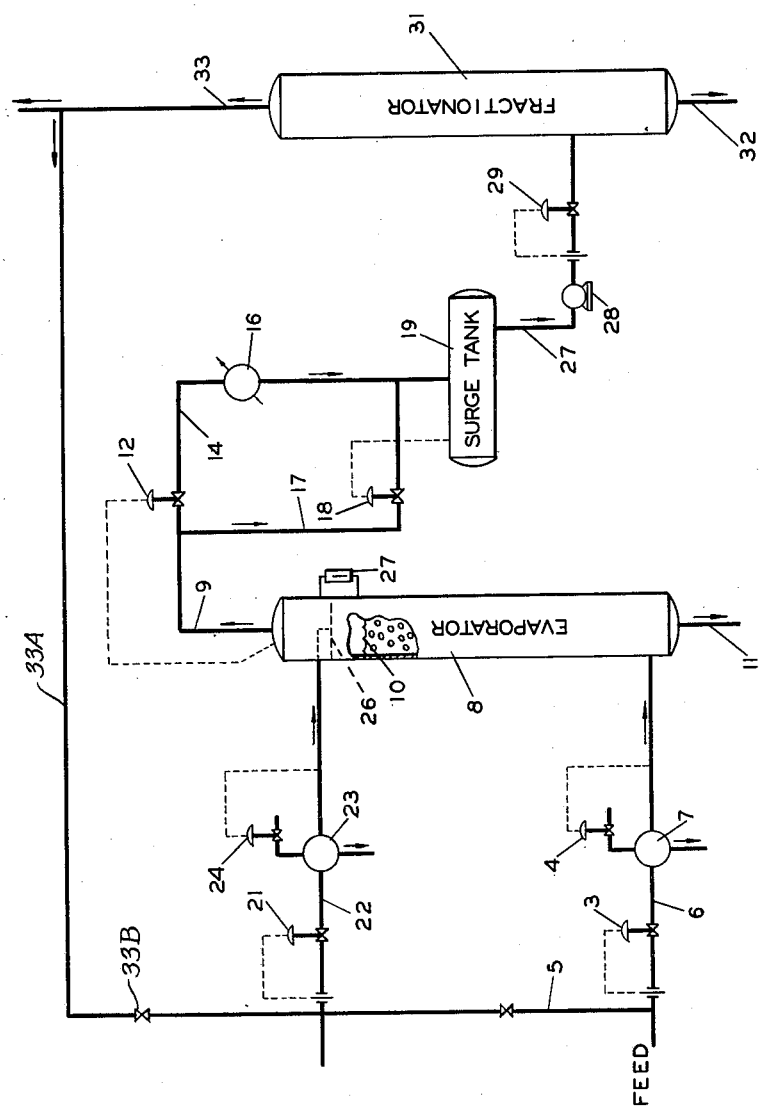
Figure 1 is an elevational view diagrammatically illustrating one application of the present invention to the continuous evaporation of a liquid in a tower with subsequent treatment of the vapor therefrom.

In Figure 1 a tower or evaporating chamber 8 is provided with a vapor outlet consisting of line 9, a liquid feed inlet consisting of line 6, and a fluid inlet consisting of line 22.

Liquid to be evaporated is introduced into tower 8 by line 6 at a constant rate by means of a conventional automatic flow regulating valve 3. Liquid is heated to the desired temperature by a steam heating unit 7 which maintains the liquid at a constant temperature by automatic temperature control valve 4 regulating the flow of steam through heater 7.

Any residues or products may be withdrawn from tower 8 through line 11.

A line 22 having an automatic flow control valve 21 and a heater 23 with a conventional automatic temperature control valve 24 are used to introduce a controlling fluid to be used to control the liquid level in tower 8, as explained subsequently in the description of the operation. An element 26 is an injection means for the injection of fluid into tower 8 from line 22 and is positioned slightly above the desired liquid level. Element 27 is a gage glass for indicating the liquid level in tower 8.

Element 26 may be constructed in various ways so as to inject vapor upon the surface of an evaporating liquid in tower 8. It may conveniently be a disk with orifices placed on the side adjacent to the liquid surface for the injection of vapor therefrom. Element 26 also may be a spider arrangement with tubes projecting downward through the liquid surface and extending a short distance below the surface. Vapors pass from orifices in the tubes of the spider and only the vapors from that portion of the tube submerged contact the liquid. Obviously many other means of injecting vapors into the surface of a liquid or into a liquid may be employed without departing from the scope of this invention.

A surge tank 19 is provided for the accumulation of condensed vapor from tower 8. An automatic pressure valve 12 is provided for maintaining pressure in evaporator 8 while permitting the flow of vapor through line 14 to a condenser 16 and thence into surge tank 19. The desired pressure in surge tank 19 is maintained by by-passing vapor through line 17 through an automatic pressure regulating valve 18 into the surge tank 19.

A fractionator 31 is provided as a means for separating the components of the effluent from tower 8 after passing through surge tank 19.

In Figure 2 element 58 is a tower or evaporating chamber which is provided with a vapor outlet consisting of line 59, a liquid feed inlet consisting of line 56, and level controlling fluid inlets consisting of lines 66 and 68. The essential elements of the tower are similar to those of Figure 1 and hence it will suffice merely to point out these elements. The temperature and rate of flow of liquid feed entering tower 58 are controlled by an automatic rate control valve 53 and a heater 57 on line 56. An automatic pressure control valve 60 is located on the vapor outlet line 59 to maintain pressure in tower 58. A level controlling fluid enters tower 58 through line 62 where the fluid is heated to the desired temperature in a heater 63, and then passes through either of lines 66 or 68, as desired. Elements 75 and 76 are injection means for uniformly distributing the level controlling fluid as it enters tower 58. Injection means 76 is positioned above the desired liquid level and injecting means 75 is positioned below the liquid level in tower 58. They may comprise a spider or disk with orifices therein similar to those described for Figure 1 from which fluid is injected into tower 58. Liquid level indicator 72 by transmission means 74 operates flow valve 73 for regulating the flow of the controlling fluid into tower 58. Valve 73 is preferably operated by a float medium as indicated in Figure 2 which opens or closes the valve 73 in the required manner to maintain the liquid level constant in tower 58 but an electrical level indicator or any other means may be used to operate valve 73 without departing from the scope of the invention. Element 71 is a gage glass to visually indicate the level of liquid in tower 58. A conduit 61 is provided for removing residues or products of evaporation from tower 58.

Although, as shown in both Figures 1 and 2, an external heater is provided for heating the liquid feed to the desired temperature of evaporation under the condition present in the evaporating chamber, the liquid in the evaporating chamber may be heated to the desired temperature by direct heating means in the chamber itself, such as by electricity, steam, and hot gases. It is possible the liquid may have such a vapor pressure under the conditions prevailing in the evaporating chamber that no heating means may be necessary, and in fact instead of heating the liquid the apparatus may be constructed to cool the liquid if necessary.

Heaters 7 and 23 of Figure 1 and heaters 57 and 63 of Figure 2 are preferably constructed so that steam enters the top of the heater through a control valve and exhaust steam and condensate is removed at the bottom of the heater. Various designs of heaters may be employed in the present invention as may be most desirable under the conditions present.

Conventional motor control valves are used in the operation of those embodiments of the invention illustrated in Figures 1 and 2 to control the rate of flow and pressures. Obviously, various other means to control these operating conditions, such as orifices, check valves, pumps, etc., may be employed without departing from the scope of the invention.

Operation of Figure 1

In the application of the present invention to the evaporation of a liquid feed as diagrammatically illustrated in Figure 1, liquid is passed through line 6 at constant flow by means of control valve 3. The liquid is heated in heater 7 to that temperature necessary to evaporate the liquid under conditions prevailing in tower 8. A valve 4 regulates the amount of steam through heater 7 necessary to heat the liquid to the desired temperature. Liquid boils in tower 8 and the vapor passes out through line 9. Liquid level in tower 8 is indicated by numeral 10. The desired pressure is maintained in the tower 8 by means of a control valve 12.

In order to maintain the liquid level substantially constant as indicated by level 10, a level controlling fluid from an outside source or from a portion of the feed through line 5 passes at a constant rate through line 22 to a heater 23. The rate of flow of the level controlling fluid is controlled by a control valve 21. The fluid is heated in heater 7 to a temperature relatively higher than the temperature of the evaporating liquid in tower 8.

A valve 24 controls the amount of steam necessary to heat the fluid to the desired temperature. The level controlling fluid passes as a vapor into tower 8 and is injected into the space preferably adjacent to the desired liquid level 10 by injection means 26. However, the level controlling fluid may be injected as well into a space some distance above or below the desired liquid level without departing from the scope of the invention.

The vapor from injection means 26 contacts or impinges upon the surface of the evaporating liquid and gives up a portion of its available heat which may be in the form of either sensible or latent heat or both. The vapor which does not contact the liquid and the vapor which has contacted the liquid but has not condensed passes out of tower 8 through line 9 along with the vapor of the evaporating liquid therein.

If the liquid level rises, more relatively hot vapor contacts the evaporating liquid surface as it comes closer to the injection means 26 and thus increases its evaporation. This increased evaporation halts the rise of the liquid level or causes it to recede. If the liquid level recedes, less relatively hot vapor contacts the surface of the evaporating liquid as it falls away from the injection means 26 and thus decreases the evaporation of the liquid. The decreased evaporation halts the receding of the liquid level or causes it to rise.

The rise or fall of the liquid level is caused by a corresponding greater or lesser quantity of liquid feed being evaporated than is entering tower 8. Thus, by increasing or decreasing the evaporation by the method described, any substantial change in the liquid level is prevented whereby the amount of liquid evaporating is equal to the amount of liquid entering.

In operation the flow rate of the liquid feed entering tower 8 through line 6 and heater 7 is preferably slightly more than the amount that would normally be evaporated in tower 8 without additional heat supplied from the injection of the hot vapors through injection means 26. In order to prevent the liquid from rising above the desired level, additional heat required to maintain the evaporation equal to the incoming liquid is supplied by hot vapor from line 22 through injection means 26. Slight variations in heat transfer from the walls of the tower caused by changing atmospheric conditions and uncontrollable variations in the heat supplied to the liquid feed, which would normally cause a corresponding variation in the rate of evaporation and consequently a rise or fall of the liquid level, will be compensated in the manner described from the available heat of the hot vapor injected adjacent to the liquid level.

The level controlling fluid injected through line 22 may be the liquid feed or a liquid or vapor from a separate source having a different composition than the liquid feed. Of course, this fluid must be a kind not harmful or detrimental to the process and capable of vaporization at reasonable temperatures. For example, in boiling a water solution, superheated steam may be used advantageously as the level controlling vapor. If a mixture of hydrocarbons is being evaporated, one of the components being vaporized may be recycled as a superheated reflux vapor through pipe 33A which may be placed in operation by opening valve 33B to supply the additional heat required to maintain the liquid level.

In case it is desirable to treat the vapor effluent from tower 8, such as the separation of the components of the vapor by fractionation, the vapor effluent passes from tower 8 through lines 9 and 14 to a surge tank 19. Prior to entry into surge tank 19, the vapor effluent is condensed by means of a condensor 16 in line 14. The desired pressure is maintained on surge tank 19 by by-passing a portion of the vapor from line 9 through line 17 and an automatic pressure control valve 18. Valve 18 is controlled by the pressure in tank 19 so that only sufficient vapor is by-passed through line 17 to surge tank 19 as is necessary to maintain the desired pressure therein. Liquid comprising the condensed vapor effluent accumulates in surge tank 19. Although the quantity of vapor effluent may fluctuate because of variations in the amount of level controlling vapor used in controlling the liquid level, a liquid feed of a constant quantity is introduced into fractionator 31 by means of line 27, pump 28, and constant flow valve 29 from tank 19 which absorbs any fluctuation in the quantity of effluent from tower 8. A low-boiling fraction is discharged from fractionator 31 through line 33, and a high-boiling fraction is discharged through line 32. These fractions may be further processed if desired (not shown).

When the level controlling fluid used has a different composition than the vapor of the evaporating liquid the separation of the level controlling fluid from the vapor product by fractionation may be required, such as illustrated in Figure 1. The recovered level controlling fluid can then be recycled through pipe 33A which may be placed in operation by opening valve 33B. Obviously, if further treatment of the vapor effluent from tower 8 is unnecessary surge tank 19 and fractionator 31 of Figure 1 with their accessory equipment may be omitted.

*Operation of Figure 2*

Since Figure 2 is a modified arrangement of the level control apparatus of Figure 1, its operation will be discussed only briefly. Liquid feed passes through line 56, constant flow valve 53, heater 57, and into evaporating chamber 58. A temperature controlled valve 54 operates heater 57 to maintain the feed at the desired temperature. Liquid evaporates in chamber 58; the vapor product leaves chamber 58 through line 59 and a constant pressure valve 60. Any residue or products may be discharged through a conduit 61 from tower 58.

A level controlling fluid from an outside source or from the liquid feed by line 55 passes through line 62, heater 63 and into chamber 58 by either line 66 or 68. To inject the level controlling fluid above the liquid level in chamber 58, valve 69 is closed and valve 67 is opened; on the other hand, if it is preferred to inject the controlling fluid below the desired liquid level valve 67 is closed and valve 69 is opened. A control valve 64 regulates the amount of steam entering heater 63 to maintain the level controlling fluid at the desired temperature and to vaporize a level controlling liquid if desired. The controlling fluid, either a liquid or a vapor, is injected into chamber 58 through injection means 76 and 75, which may be similar to the type of injection means previously described.

A float or level indicator 72 operates valve 73 to vary the quantity of level controlling fluid entering chamber 58 in such a manner as to maintain the liquid level relatively constant.

It should be noted that the essential difference in maintaining the liquid level in Figures 1 and 2 is that in the operation of an arrangement similar to Figure 1 the quantity of level controlling fluid entering tower 8 is substantially constant but the amount of level controlling fluid actually contacting the liquid varies inversely as the distance from the injection means; while in an arrangement similar to Figure 2 the actual contact between level controlling fluid and evaporating liquid is more or less constant but the quantity of level controlling fluid entering chamber 58 is varied with a change in liquid level. Whether the quantity of controlling fluid in Figure 2 is increased or decreased by a change in the liquid level will depend on several factors, including the temperature of the controlling fluid itself and whether the controlling fluid is injected as a liquid or vapor.

For example, in some cases it may be desirable to inject the level controlling fluid below the desired liquid level through line 68 as a liquid which is relatively colder than the evaporating liquid in the tower. When operating in this manner the liquid feed is introduced into chamber 58 at a slightly lower rate than the liquid would be normally evaporated under the conditions prevailing in evaporating chamber 58. Float control 72 and valve 73 are so connected by transmission means 74 that when the liquid level rises above the desired height the quantity of relatively cold level controlling liquid injected into the evaporating liquid is decreased, and when the liquid level falls below the desired height the quantity of relatively cold level controlling liquid injected is increased. Because of the heat absorbed by the relatively cold liquid which is injected into the evaporating liquid in varying amounts depending on the height of the liquid level, the evaporation is increased when the liquid level rises and the evaporation is decreased when the liquid level falls. If the level controlling fluid is injected into chamber 58 as a relatively cold vapor instead of liquid through line 68, the quantity of vapor is controlled in the same manner as when using a level controlling liquid. The relatively cold vapor absorbs heat from the relatively hot evaporating liquid and passes out of the evaporating chamber 58 with the vapor product.

Level controlling vapor which is at a relatively higher temperature than the evaporating liquid in chamber 58 may also be used to control the liquid level by the arrangement illustrated in Figure 2. The level controlling vapor may be injected into chamber 58 either through line 66 and injection means 74 above the desired liquid level or through line 68 and means 75 below the desired liquid level. Valve 73 by means of float or level control 72 increases the quantity of relatively hot vapor injected when the liquid level rises and decreases the quantity of vapor when the liquid level falls.

The embodiment of the invention illustrated in Figure 1 does not require a mechanical liquid level indicating means and hence would be especially applicable to the mixed-phase isomerization process, such as described in patent by R. W. Henry, Patent No. 2,366,028, where a boiling hydrocarbon liquid in a reaction chamber contains deposited aluminum chloride. This condition of deposited aluminum chloride often causes plugging and corrosion of any mechanical type of level control apparatus having moving parts, etc.

In such an isomerization process, normal butane is isomerized to isobutane by evaporating a hydrocarbon liquid mixture containing normal butane in a reaction chamber in the presence of an aluminum halide catalyst under appropriate conditions of temperature, pressure, etc. Isobutane is withdrawn from the reaction chamber with the vapor effluent and subsequently separated by fractionation. A portion of the isobutane may be recycled to the reaction chamber as a superheated reflux vapor to control the liquid level of the evaporating hydrocarbon mixture in the reaction chamber similar to the manner described herein.

In general, the available heat supplied by the level controlling fluid itself is about 2 to 5 per cent of the total heat required to evaporate the liquid at a rate equivalent to the rate of feed entering the evaporating chamber. However, as much as 10% or more of the heat of evaporation may be supplied by the level controlling fluid if necessary.

To those skilled in the art it will appear evident that other types of apparatus or elements thereof capable of achieving the same result may be substituted for portions of the apparatus in this invention and it will also appear that certain apparatus may be omitted under some conditions of operation such as the omission of surge tank 19 and fractionator 31 in Figure 1. These, however, constitute only minor changes in operation and are naturally within the scope of the invention.

Having described preferred forms of the present invention and having pointed out the principle considerations to be observed in the construction and operation of equivalent systems, it is obvious that various other changes can be made without departing from the scope of the invention, which is defined only by the following claims.

Having described my invention, I claim:

1. An evaporator comprising a chamber, a liquid inlet line connected to the bottom portion of said chamber, means to control the rate of flow of liquid in said liquid inlet line at a constant rate, heat exchange means to control the temperature of said liquid in said liquid inlet line at a constant temperature, a spray head in the chamber, intermediate the ends thereof, a superheated vapor inlet line connected to said spray head in the chamber, means to control the rate of flow of superheated vapor in said superheated vapor inlet line at a constant rate, heat exchange means to control the temperature of said superheated vapor at a constant superheated temperature, said spray head being positioned in said chamber at a point intermediate the top and bottom of said chamber and spaced above the desired level of liquid in said chamber, and an outlet conduit connected to the top of said chamber for the evaporated liquid.

2. An evaporator comprising a chamber, a liquid inlet line connected to the bottom of said chamber, means to control the rate of flow of liquid in said liquid inlet line, heat exchange means to control the temperature of said liquid in said liquid inlet line, a spray head in said chamber, intermediate the ends thereof, a superheated vapor inlet line connected to said spray head in the chamber, flow control means in said superheated vapor line to control the rate of flow of superheated vapor in said superheated vapor inlet line, heat exchange means to control the temperature of said superheated vapor, said spray head being positioned in said chamber at a point intermediate the top and bottom of said chamber and spaced above the desired level of liquid in said chamber, and an outlet conduit connected to the top of said chamber for the evaporated liquid.

3. A mixed phase isomerization process for the isomerization of normal butane to isobutane comprising introducing liquid normal butane into an evaporating zone containing packing and an aluminum halide catalyst deposited on said packing, said liquid butane being introduced to said zone at a temperature and at a rate selected so that while rapid evaporation occurs the liquid level will gradually rise in said zone, and arresting the rise of said liquid level by forming a barrier of a superheated vapor in said zone at a temperature in excess of the boiling point of said liquid at a point spaced above said desired liquid level, whereby said liquid level is controlled at a level where heat exchange with said superheated vapor provides sufficient thermal units to complete the evaporation of the rising liquid, isomerizing a portion of said normal butane to isobutane in said zone, and removing said isobutane as a vapor.

4. An evaporator comprising a chamber, a liquid inlet line connected to said chamber, first control means in said liquid inlet line adapted to maintain a constant flow rate therethrough, first heat exchange means in said liquid inlet line, heat input control means operatively connected to said liquid inlet line and responsive to the temperature of liquid in said liquid inlet line downstream of said first heat exchange means, injection means in said chamber intermediate the ends of said chamber, a vapor inlet line connected to said injection means, second flow control means in said vapor inlet line adapted to maintain a constant flow rate therethrough, second heat exchange means in said vapor inlet line, heat input control means in said second heat exchange means operatively connected to said vapor inlet line and responsive to the temperature in said vapor inlet line downstream of said second heat exchange means, and an outlet conduit connected to the top of said chamber.

5. An evaporator comprising a chamber, a liquid inlet line connected to the bottom of said chamber, first control means in said liquid inlet line adapted to maintain a constant flow rate therethrough, first heat exchange means in said liquid inlet line, heat input control means in said first heat exchange means operatively connected to said liquid inlet line and responsive to the temperature of liquid in said liquid inlet line downstream of said first heat exchange means, injection means in said chamber intermediate the ends of said chamber, a vapor inlet line connected to said injection means, second flow control means in said vapor inlet line adapted to maintain a constant flow rate therethrough, second heat exchange means in said vapor inlet line, heat input control means in said second heat exchange means operatively connected to said vapor inlet line and responsive to the temperature in said vapor inlet line downstream of said second heat exchange means, and an outlet conduit connected to the top of said chamber.

6. An evaporator comprising a chamber, a liquid inlet line connected to the bottom of said chamber, first heat exchange means in said liquid inlet line, heat input control means in said first heat exchange means operatively connected to said liquid inlet line and responsive to the temperature of liquid in said inlet line downstream of said first heat exchange means, injection means in said chamber intermediate the ends of said chamber, a superheated vapor inlet line connected to said injection means, second heat exchange means in said vapor inlet line, heat input control means in said second heat exchange means operatively connected to said vapor inlet line and responsive to the temperature of vapor in said vapor inlet line downstream of said second heat exchange means, and an outlet conduit connected to the top of said chamber.

JOSEPH E. STORMENT.

REFERENCES CITED

The following references are of record in the file of this patent:

UNITED STATES PATENTS

| Number | Name | Date |
|---|---|---|
| 50,935 | Johnston | Nov. 14, 1865 |
| 1,585,791 | Ruths | May 25, 1926 |
| 1,682,674 | Hedlund | Aug. 28, 1928 |
| 1,770,256 | Smekal | July 8, 1930 |
| 1,781,836 | Flatt | Nov. 18, 1930 |
| 1,802,531 | Prichard | Apr. 28, 1931 |
| 2,104,310 | Roelfsema | July 4, 1938 |
| 2,222,575 | Schutte | Nov. 19, 1940 |
| 2,263,687 | Wunsch | Nov. 25, 1941 |
| 2,322,102 | Gschwind | June 15, 1943 |
| 2,366,028 | Henry | Dec. 26, 1944 |
| 2,375,321 | Nysewander et al. | May 8, 1945 |
| 2,388,931 | Nelson | Nov. 13, 1945 |
| 2,403,107 | McAllister | July 2, 1946 |

FOREIGN PATENTS

| Number | Country | Date |
|---|---|---|
| 554,742 | Great Britain | July 16, 1943 |